United States Patent [19]

Windle

[11] Patent Number: 4,754,157

[45] Date of Patent: Jun. 28, 1988

[54] FLOAT TYPE WAVE ENERGY EXTRACTION APPARATUS AND METHOD

[76] Inventor: Tom J. Windle, 3500 SE. Washington, Bartlesville, Okla. 74003

[21] Appl. No.: 917,787

[22] Filed: Oct. 10, 1986

Related U.S. Application Data

[63] Continuation-in-part of Ser. No. 782,986, Oct. 1, 1985, abandoned, which is a continuation-in-part of Ser. No. 513,627, Jul. 14, 1983, abandoned.

[51] Int. Cl.$^4$ .............................................. F03B 13/12
[52] U.S. Cl. ...................................... 290/53; 290/42; 290/43; 417/330; 417/331; 60/495; 60/496
[58] Field of Search ...................... 290/42, 43, 44, 45, 290/52, 53, 54, 55; 417/330–333; 60/495–508

[56] References Cited

U.S. PATENT DOCUMENTS

| | | | |
|---|---|---|---|
| 3,827 | 8/1882 | Hardings | 60/501 |
| 3,030,893 | 4/1962 | Shaffer | 417/331 |
| 3,040,667 | 6/1962 | Shaffer | 417/331 |
| 3,126,830 | 3/1984 | Dilliner | 417/331 |
| 3,394,658 | 7/1968 | Johnson | 417/333 |
| 3,567,953 | 3/1971 | Lord | 290/53 X |
| 3,696,251 | 10/1972 | Last et al. | 290/53 |
| 3,898,471 | 8/1975 | Schera | 290/53 X |
| 3,918,260 | 11/1975 | Mahneke | 60/504 X |
| 4,076,463 | 2/1978 | Welczer | 60/499 X |
| 4,104,006 | 8/1978 | Meiri | 417/334 |
| 4,191,893 | 3/1980 | Grana et al. | 290/53 |
| 4,242,593 | 12/1980 | Quilico et al. | 290/42 X |
| 4,249,084 | 2/1981 | Villaneuva et al. | 290/53 X |
| 4,291,234 | 9/1981 | Clark | 290/42 X |
| 4,398,095 | 8/1983 | Ono | 60/497 X |
| 4,421,461 | 12/1983 | Hicks et al. | 417/53 |
| 4,464,578 | 8/1984 | Masubuchi | 60/501 X |

FOREIGN PATENT DOCUMENTS

| | | | |
|---|---|---|---|
| 0059241 | 5/1977 | Japan | 290/53 |
| 0026280 | 2/1982 | Japan | 290/53 |

Primary Examiner—William M. Shoop, Jr.
Assistant Examiner—Paul Ip

[57] ABSTRACT

An apparatus and method of obtaining useful energy from wave action in a body of water. The apparatus comprises a cylinder, a reciprocal piston in the cylinder, a piston rod connected to the piston and extending sealably out of the cylinder, a mechanical tensioning device connected between the piston and the cylinder for maintaining resilient tension between the piston and the cylinder, a float connected to one of the piston rod or the cylinder, an anchor flexibly connected to the other of the piston rod or the cylinder which is not connected to the float, an inlet check valve and an outlet check valve connected to the cylinder, and a conduit extending from the outlet check to an area where water may be usefully employed. The mechanical tensioning device may be a spring or a weight and tether. The apparatus and method may be used to operate a hydroelectric generator.

31 Claims, 6 Drawing Sheets

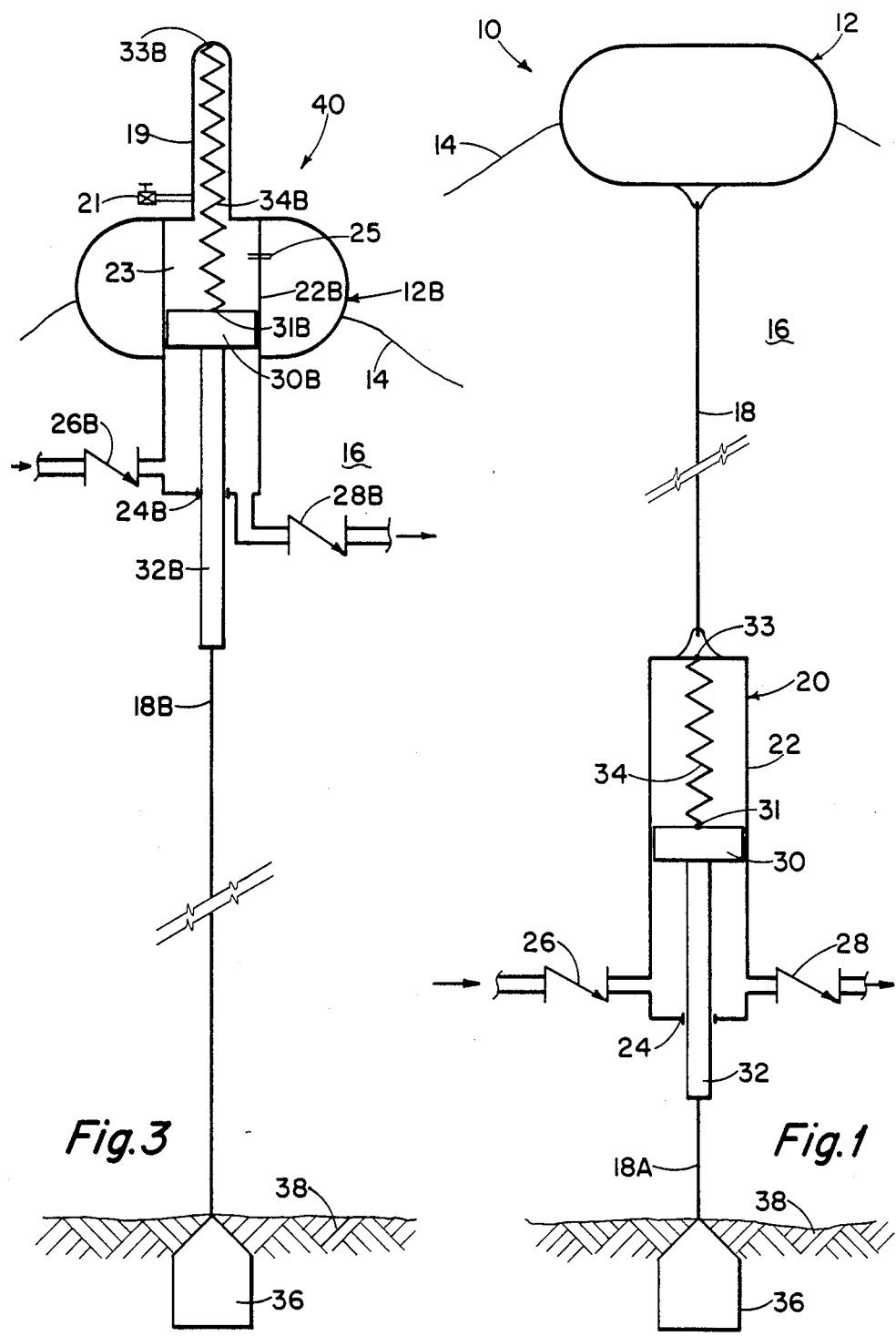

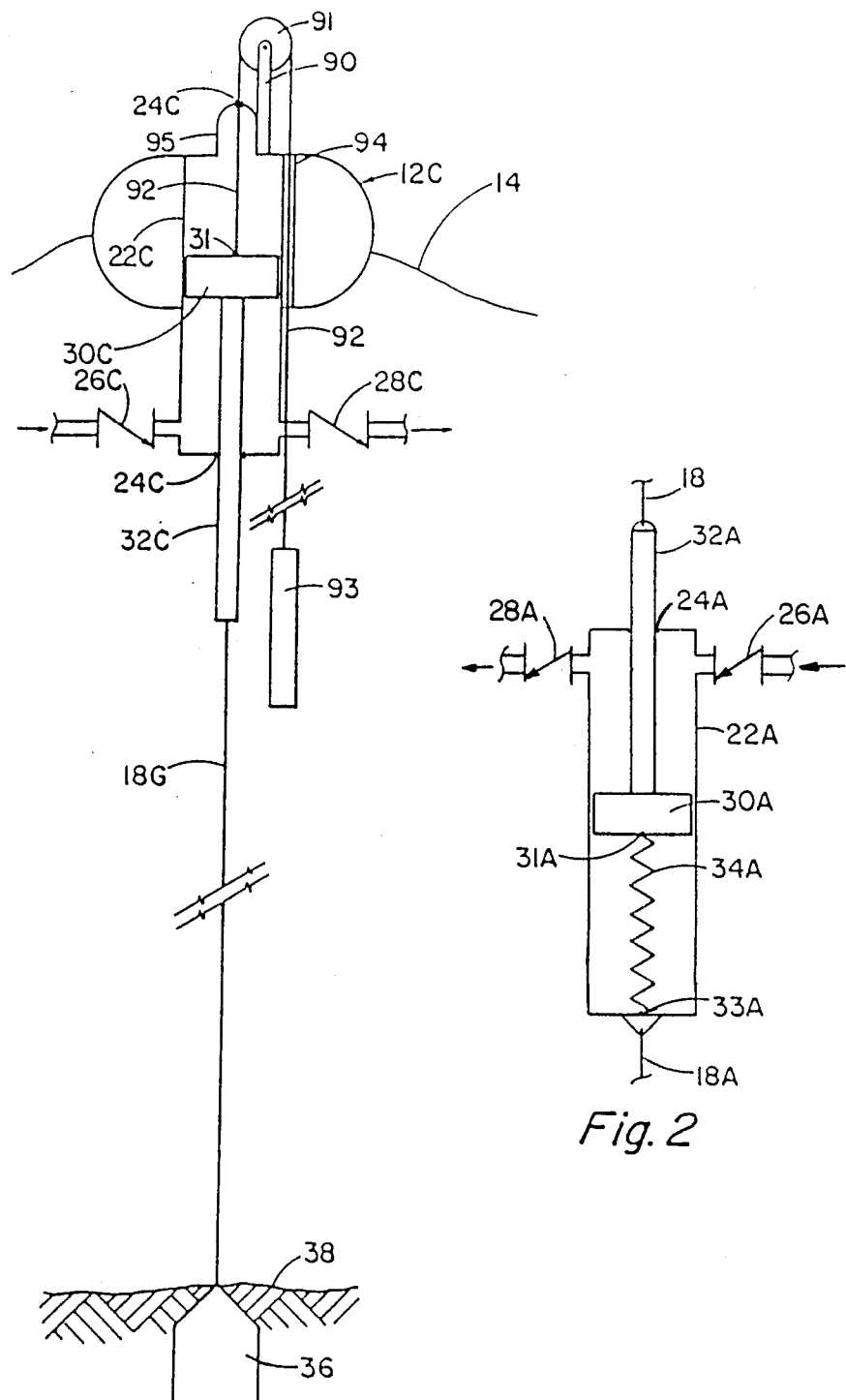

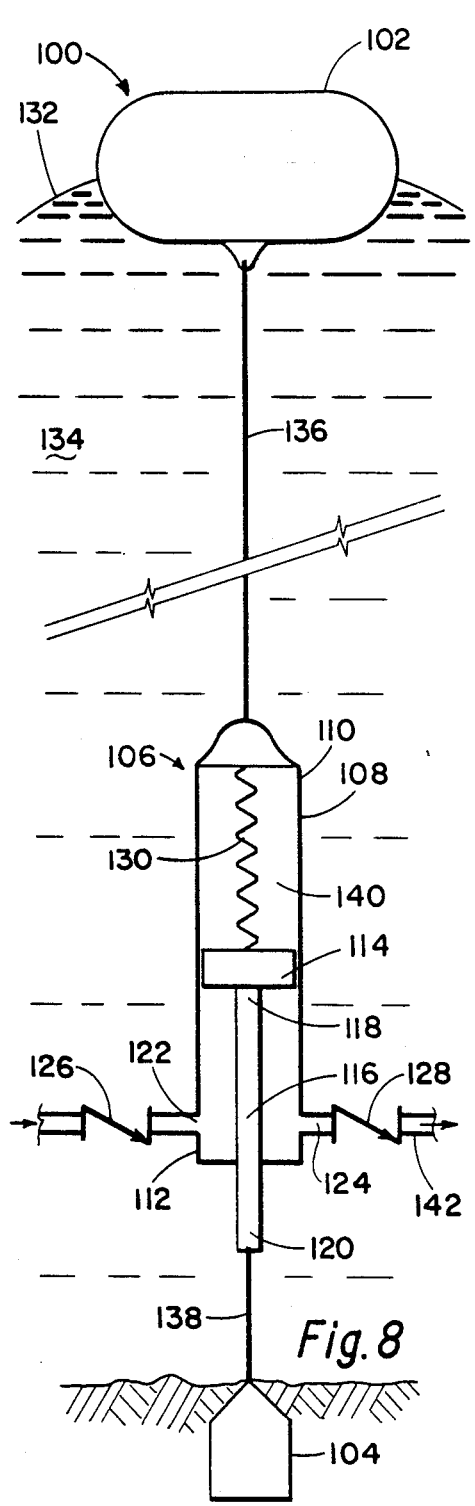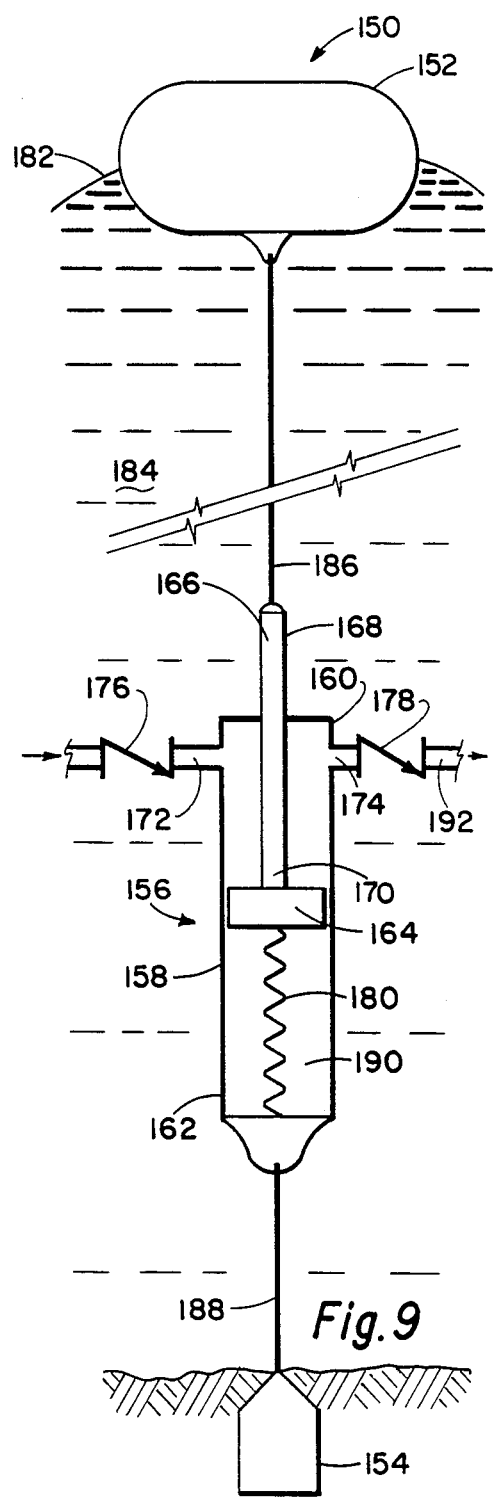

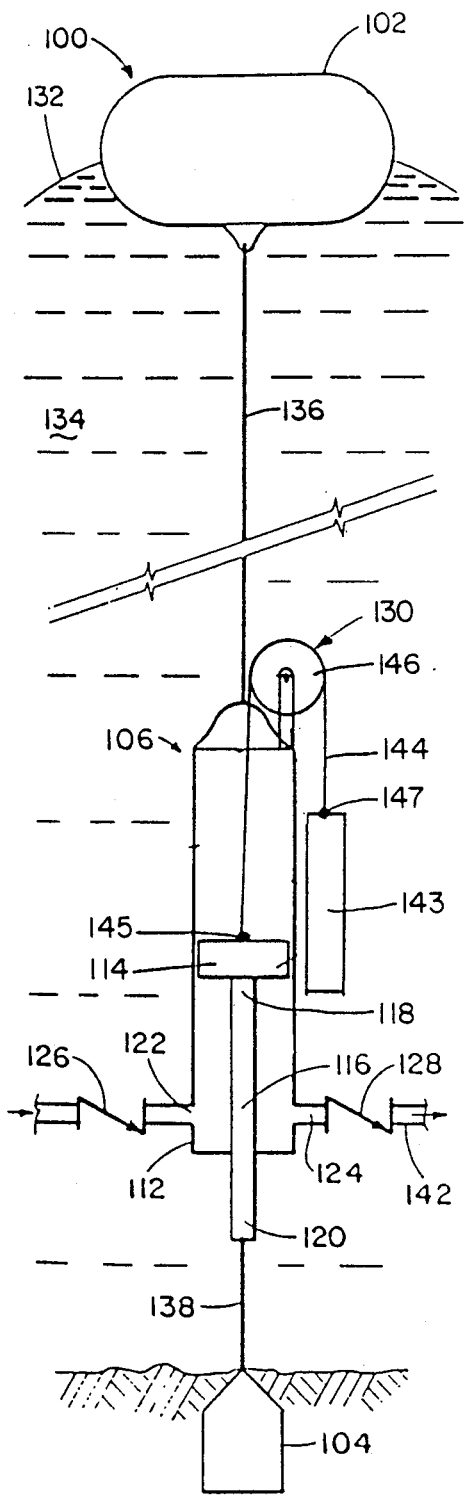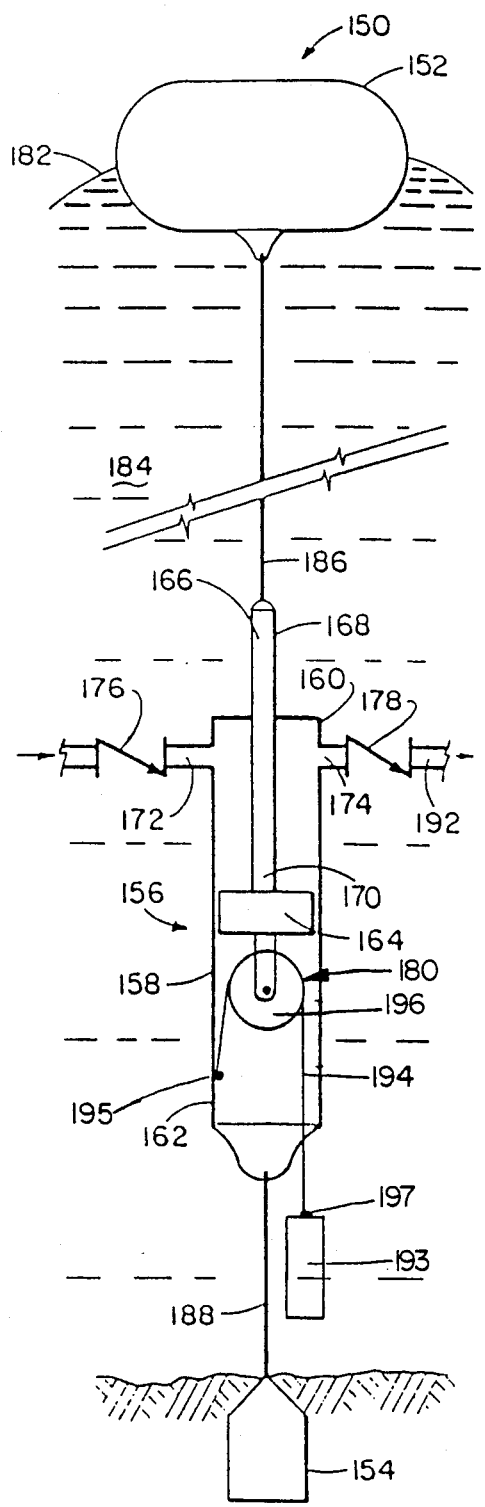
Fig. 11
Fig. 12

FLOAT TYPE WAVE ENERGY EXTRACTION APPARATUS AND METHOD

CROSS REFERENCE TO RELATED APPLICATIONS

This application is a continuation-in-part of application Ser. No. 782,986, filed Oct. 1, 1985, which is a continuation-in-part of application Ser. No. 513,627, filed July 14, 1983.

BACKGROUND OF THE INVENTION

This invention relates to devices which extract energy from wave action in a body of water. More particularly it concerns the extraction of energy from wave action utilizing a float, a piston-cylinder pump, and an anchor.

Various types of devices which attempt to extract energy from wave action in a body of water or from the wind have been known for some time. For example, U.S. Pat. No. 4,421,461 issued to Hicks et al. discloses a water wave-powered piston pump. The piston pump is mounted on a cradle. The cradle consists of two plates, an upper plate and lower plate. The upper side of the upper plate is secured through a sacrificial link to the float on the upper side and the lower side of the upper plate is secured via a yoke to the pump piston rod which extends out the bottom of the cylinder. The upper side of the lower plate of the cradle is attached to the bottom of the pump cylinder and the lower side of the lower plate is attached to the anchor via a flexible tether. A multiplicity of circumferentially spaced elastomeric springs surround the cylinder of the pump externally to the cylinder. The springs are connected between the upper plate and lower plate of the cradle. A polymeric ball is supported in the upper face of the piston and retained therein by a compression spring biased lock plate. As the float rises the compression spring inside the pump cylinder is compressed which compresses the polymeric ball between the spring biased lock plate and the piston. The polymeric ball expands radially due to the compression and seals the cylinder against leakage past the piston. Also, as the pump rises the multiplicity of circumferentially spaced elastomeric springs external to the cylinder are stretched and are used as external return springs which impel the pump piston rod on its down or refill stroke as the float falls on a wave.

U.S. Pat. No. 4,398,095 issued to Ono discloses a wave-activated power generation system of the float type. A piston-cylinder type pump is anchored to the bottom of a body of water and the float is connected to the piston. As the float rises on a wave the piston is lifted and water is discharged from the pump into an elevated reservoir. Ono uses the hydraulic differential pressure between the air at the surface of the body of water and the depth of the piston cylinder pump in the body of water to move the piston downwardly in the cylinder as the float falls with a descending wave. Because of this use of hydraulic pressure rather than resilient tension between the float and the anchor the Ono device is solidly supported from the bottom of the body of water in order to resist the downward hydraulic pressure. Therefore the bottom of the body of water must be accessible, which either limits the depth of water in which the Ono system can be used or requires additional, expensive equipment to position and maintain the system.

U.S. Pat. No. 4,104,006 issued to Meiri discloses a wind-powered energy conversion device. The device includes a pair of flaps which are connected to the piston of a piston-cylinder type pump by cable. A tension spring is connected between the piston and the platform upon which the piston pump is mounted. As wind lifts the flaps the cable pulls the piston upwardly and stretches the spring. When the wind decreases the spring pulls the piston back down. The Meiri device does not use or require a float and is rigidly mounted to the platform or ground.

A drawback to the prior wave energy extraction devices is that they are relatively complex and expensive to maintain and manufacture. Since one of the main purposes of developing wave energy extraction devices is to reduce the cost of energy, the costs involved in maintaining and the manufacturing the wave energy extraction devices is a very important factor in the practicability of the devices. Thus, there is a need in the art for a wave energy extraction device which is inexpensive to manufacture and maintain.

SUMMARY OF THE INVENTION

It is an object of this invention to provide a wave energy extraction apparatus which is inexpensive to maintain and manufacture, even to the point of being expendable, that is, if the device becomes inoperative it can simply be replaced. The invention achieved this object by connecting a mechanical tensioning means, such as a tension spring or weight and tether, between the piston and cylinder of a piston-cylinder pump which is reciprocable and flexibly connected between a float and an anchor in a body of water. This previously unknown combination creates a wave energy extraction apparatus of previously unachievable simplicity and economy which can be used in virtually any depth of water.

It is also an object of this invention to provide a wave energy extraction apparatus in which part of the energy generated by the wave lifting the float, is transferred to a temporary energy storage means such as a spring or moving weight, so that part of the original energy imparted to the float is given back into the system as the float returns to its lower position.

Accordingly the wave energy extraction apparatus of the present invention includes a reciprocating pump flexibly connected between a float and an anchor. The pump includes a cylinder having a top end and a bottom end with a reciprocal piston in the cylinder. The piston has a piston rod connected to it which extends out the bottom of the cylinder. The anchor is flexibly connected to the outside end of the piston rod and anchors the piston rod relative to the cylinder. The float is connected to the cylinder and upstrokes the cylinder relative to the piston in response to a rising wave action. A mechanical tensioning means is mechanically connected between the cylinder and piston for maintaining resilient tension between the piston and cylinder. In one form the mechanical tensioning means is a tension spring which is mechanically connected between the cylinder and piston. In another form the mechanical tensioning means is a weight and tether. The tether extends from a fast connection with the piston through a slidable connection with the cylinder to a fast connection with the weight. The slidable connection of the tether to the cylinder may be a simple pulley. An inlet check valve and an outlet check valve are connected to the cylinder. As the float rises in response to a rising wave action the upstroking cylinder expels water through the outlet check valve. As the float falls in response to falling wave action the mechanical tensioning means downstrokes the cylinder relative to the piston and draws water into the cylinder through the inlet check valve. A conduit may be connected to the outlet check valve and extended to an area where the pump water may be usefully employed such as for generating electricity.

In another embodiment of the present invention the piston rod extends sealably out the top end of the cylinder. The float is connected to the outer end of the piston rod and the anchor is flexibly connected to the cylinder. The mechanical tensioning means is mechanically connected between the cylinder and the piston as previously discussed. In one form, the mechanical tensioning means is a tension spring which is mechanically connected between the cylinder and the piston, and in another form the mechanical tensioning means is a weight and tether. The tether extends from a fast connection with the cylinder through a slidable connection with the piston to a fast connection with the weight. In this embodiment, as the float rises in response to a rising wave action the float upstrokes the piston relative to the cylinder and expels water through the outlet check valve. As the float falls in response to a falling wave action the mechanical tensioning means downstrokes the piston relative to the cylinder and thereby draws water into the cylinder through the inlet check valve.

It is an advantage of the present invention to provide a simple, inexpensive wave energy extraction apparatus which may include, in sequence, a float connected to a piston or cylinder, a single tensile spring or a single weight and tether connected between the piston and cylinder, and an anchor flexibly connected to the one of the piston or cylinder to which the float is not connected. The apparatus is extremely simple in concept, operation, and maintenance, may be inexpensibly constructed of styrofoam and polymer, and thus is expendable. If maintenance is performed on the apparatus it is simple and straight forward because of the simplicity of the device itself.

It is another advantage of the present invention to provide automatic adjustment for variations in the depth of the body of water, such as are caused by changes in tide.

BRIEF DESCRIPTION OF THE DRAWINGS

The present invention will be better understood by reference to the examples of the following drawings:

FIG. 1 is a schematic diagram of the wave energy extraction apparatus of the present invention in which the float is connected to the cylinder and the anchor is connected to the piston;

FIG. 2 is a partial schematic diagram of one embodiment of the present invention in which the float may be connected to the piston and the anchor may be connected to the cylinder;

FIG. 3 is a schematic diagram of an embodiment of the wave energy extraction apparatus in which the pump is contained within the float;

FIG. 4 is an alternative embodiment of FIG. 3 in which the spring is replaced with a weight and tether;

FIG. 8 is a duplication of FIG. 1 which has been renumbered for purposes of more detailed explanation;

FIG. 9 is a full view of the partial schematic diagram of FIG. 2 which has been renumbered for purposes or more detailed explanation;

FIG. 11 is an alternative embodiment of FIG. 8 utilizing a weight and tether as a mechanical tensioning means;

FIG. 12 is an alternative embodiment of FIG. 9 utilizing a weight and tether as a mechanical tensioning means.

DESCRIPTION OF THE PREFERRED EMBODIMENTS

Figure 5:
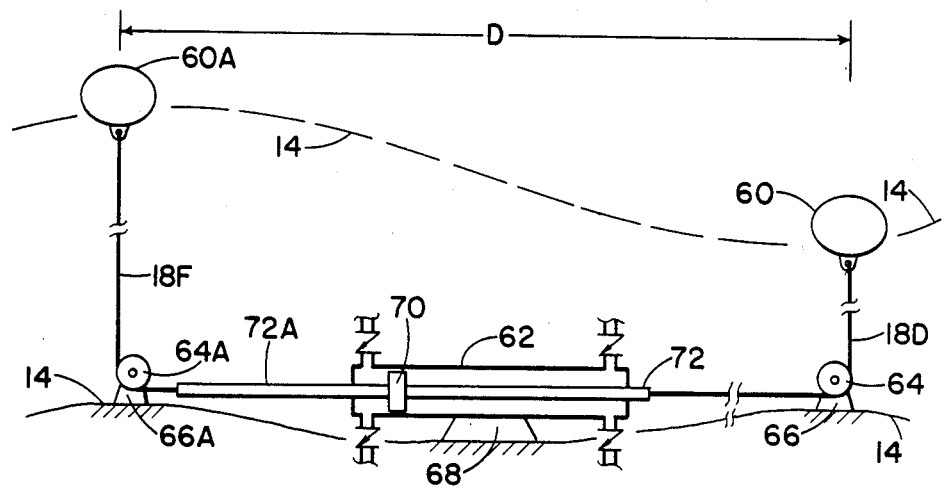
FIG. 5 is a schematic diagram of an embodiment of the wave energy extraction apparatus in which the pump is located in a horizontal position on the bottom of the body of water and two floats are used to operate the pump.

Referring now to the drawings and in particular to FIG. 1 there is illustrated schematically one embodiment of this invention. The entire system is indicated generally by the numeral 10. It comprises a float system indicated generally by the numeral 12 floating on the water surface or wave surface 14 of the sea 16. A flexible tension means or tether 18 ties the float to a pump system 20 comprising a cylinder 22 and a piston 30. An energy storage means such as a mechanical spring 34 is interposed between the cylinder 22 and the piston 30. The compliance, or compliant means 34 is tied to the cylinder at point 33 and to the piston at point 31. This could, of course, be positioned outside of the cylinder if desired. For example, it could be connected between the outside of the cylinder 22 and piston rod 32. A conventional stuffing box 24 may be used to pass the piston rod 32. The conventional check valves 26 and 28 would of course be required.

The compliant means, or compliance, or spring 34 is an energy storage means. This accepts energy from the float (as the float rises, stretching the spring) and gives it up again as the float drops.

Its purposes are several:

1. it permits extending the length of the tether as the tide raises the entire water surface, permitting the float to ride the top of the waves;

2. it maintains the tether in tension so that its action on the piston is like a rigid "pusher". Since the flexible tether can't push on the piston to move it up into the cylinder as the float lowers, the spring pulls it into the cylinder (and also draws liquid into the cylinder);

3. it makes the flexible tether system work like the rigid tether system, but is simpler and cheaper than the rigid system, and can be quickly adjusted for any depth of water.

Another method of energy storage will be described in connection with FIG. 4. This involves a flexible cable 92 attached to the top of the piston at 31. The cable 92 passes over a pulley 91 mounted on a support 90 attached to the float, and down through a passageway (or pipe) 94 to a weight 93 of selected mass. The tension in the cable 92 serves the same purpose as the tension in the spring 34, that is, both the spring 34 and the weight and cable maintain a resilient tension between the piston 30 and cylinder 22, except that the cable 92 provides a constant force rather than a variable force. Also the tension in cable 92 can be changed readily by changing weight 93.

FIG. 2 is a duplicate of the system of FIG. 1 except that the float is now tied to the piston rod through tension means 18 and the cylinder 22A is tied to the anchor means through tension means 18A. All parts are correspondingly numbered to FIG. 1. To be more specific, the example of FIG. 2 provides an apparatus for pumping water using energy from wave action in a body of water, comprising: a cylinder 22A closed at the bottom end and having an opening 24A at the top end; a reciprocal piston 30A in said cylinder 22A; an inlet and an outlet in said cylinder; and an inlet check valve 26A in communication with said inlet and an outlet check valve 28A in communication with said outlet. A pipeline (not illustrated) may be connected with said outlet check valve 28A and extended to an area where pumped water may be usefully employed. The apparatus of FIG. 2 also comprises: a piston rod 32A affixed to said piston 30A and extending sealably out said opening 24A in the top of said cylinder 22A; an anchor means (not illustrated) affixed to said cylinder; a float means (not illustrated) affixed to said piston rod 32A exteriorly of said cylinder whereby said piston 30A is reciprocated relative to said cylinder 22A in response to wave motion; and a tension spring 34A within said cylinder and extending between the interior bottom of said cylinder and said piston the said spring maintaining said float under downward tension at all times. In the apparatus of FIG. 2 the float means is connected to said piston rod 32A by a cable, or tether, 18. Also, in the apparatus of FIG. 2, the anchor means is connected to said cylinder 22A by a cable, or tether, 18A.

Another variation of FIG. 1 is shown in FIG. 3. This would be to place the cylinder 22B and compliance 34B within the float 12B. This system is indicated generally by the numeral 40. A vertical extension 19 to the float would be helpful to encase the compliance or spring 34B. The spring is attached at its top end at point 33B, and at the piston at point 31B. The piston 30B has a piston rod 32B which extends through the packing gland 24B to the tension member 18B which ties the piston to the anchor 36 on the sea floor 38.

It will be clear as shown in FIGS. 1, 2, and 3 that the cylinders must be provided with conventional check valves at inlet and out, as is well known in the art. Also the cylinder can be attached to the float as in FIGS. 1 and 3, or to the anchor as shown in FIG. 2.

In FIG. 3, the space above the piston identified as 23 is shown as a closed volume. If this space is filled with air, it will act as a compliance in opposition to the spring. This problem can be overcome in several ways. For example, the volume 23 can be enlarged to include all the volume in the float by means of opening 25 in the top of the cylinder wall. Another way to handle the problem would be to open the top of the cylinder to the atmosphere by means of the valve 21, for example.

There are also a number of ways to store energy, as are well known. One of the simplest is to store energy as potential energy in a compressed compliance, such as a compressed gas, or compressed (or extended) spring. The other is to store energy as potential energy of a mass raised above the earth. FIGS. 1, 2 and 3 have illustrated the energy storage in the form of a compressed (or extended spring). The other is illustrated in FIG. 4.

Referring now to FIG. 4, a float 12C, cylinder 22C, piston 30C, with tether 18G and anchor 36 are similar to those in FIG. 3. However, the spring 34 is replaced by the flexible tension means or cable 92 attached to the piston at 31, which passes upwardly and over the pulley 91 supported on post 90 to the float 12C. The cable 92 then passes down through an open passageway (which may be a pipe sealed into the float) to a weight 93. As the float rises, the piston stays fixed in elevation, and the weight rises at twice the rate of the float, and liquid is expelled from the bottom end of the cylinder. As the wave lowers, the float lowers, and the piston is held up by the cable 92, in effect moving it up into the cylinder and drawing new liquid into the cylinder.

Another embodiment using the pump comprising a cylinder and a piston as the power extraction means is illustrated in FIG. 5. Here there are two sub-systems, the first comprising a float 60 with tension member 18D tied to the float. A second sub-system provides a float 60A with tension members 18F tied to the float. These two float systems are schematically identical. The two floats are separated by a horizontal distance D which is approximately one-half of the wave length of the surface waves measured along a direction perpendicular to the wave front. Thus, the two floats will be operating in an up and down motion 180 degrees out of phase.

The tension member 18D from the first sub-system and the tension member 18F from the second sub-system go to separate pulleys 64 and 64A, respectively, which are in the vertical plane through the two floats and are anchored to the sea floor. A cylinder 62 is anchored on the line joining the two pulleys 64 and 64A so that the piston rods 72 and 72A which extend out of the two ends of the piston 70 will be coaxial with the tension members between the pulleys. Conventional valving will be, of course, used. There will be, though not shown, the conventional stuffing glands at each end of the cylinder so that the piston rods can slidably seal the internal volume of the cylinder.

Consider that the wave is moving to the right in FIG. 5. The first float 60 will move upwardly with time and, of course, the float 60A which is now at the peak will move downwardly, and will soon be in a trough while 60 will be on a peak. The tension system then will thus move the piston from the left end of the cylinder to the right end of the cylinder. When the wave moves another half wave length, the reverse will happen and the piston will move back to the left side again. Thus, a double acting system is provided by use of the two floats in proper positioning on the line perpendicular to the wave front.

Figure 6:
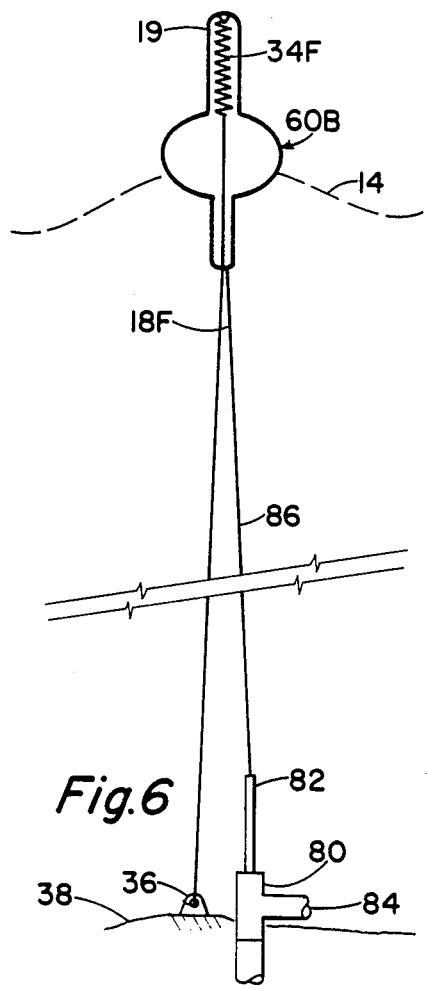
FIG. 6 is an embodiment of the wave energy extraction apparatus used to pump a sub-surface well.

FIG. 6 represents another embodiment in which a pump is powered by means of a float system 60B having the improvement of the energy storage compliance 34F, and a tension member 18F, and an anchor point 36 on the sea floor 38. In this case the pump could be a tubing pump in a water or oil well, which are operated by conventional sucker rods 82. The sucker rods are tied directly to the float 60B. Pump outlet would be at 84.

Figure 7:
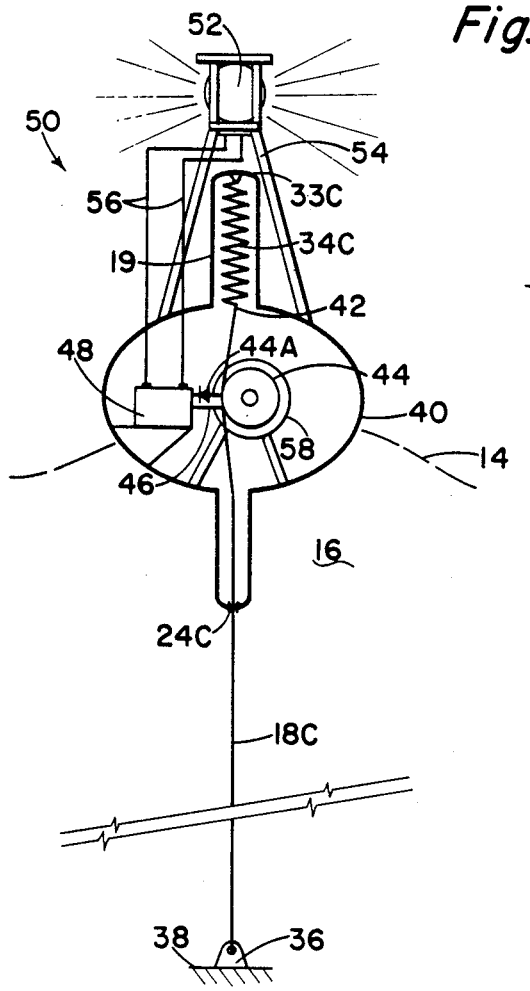
FIG. 7 is a schematic diagram of an embodiment of the wave energy extraction apparatus used to operate a light mounted on the apparatus.

FIG. 7 represents schematically a different embodiment, in which the power extractive means is electrical, and the power generated is used to power a beacon light mounted on the float. The entire system is contained by the float 40, except for an anchor cable, or flexible tension member 18C and anchor system at point 36 on the sea floor 38.

The system is indicated generally by the numeral 50 and comprises the float 40 which floats on the surface 14 of the body of water 16. Again, the compliant member 34C is tied to the float at point 33C and to a tension means 18C at point 42. The flexible tension means 18C drives a pulley 44, on the shaft of the generator 58, which is supported by the float inside of the float. The generator leads 46 would go through a rectifier 44A to a battery 48 which would store the varying output of the generator as the wave height changes. Appropriate leads 56 would go from the battery to the beacon light 52 which would be mounted on supports 54 to the top of the float.

FIG. 8 presents an example embodiment of a wave energy extraction or pumping apparatus, based on FIG. 1, generally designated by the reference number 100. The apparatus 100 is generally comprised of a float means 102, an anchor means 104, and an energy extraction means, generally designated 106, connected between the float means 102 and the anchor means 104. In this embodiment, the energy extraction means 106 is a pump means which is comprised of a cylinder 108. The cylinder 108 is normally retained in a generally vertical position by the float means 102 and the anchor means 104, and, in the example embodiment has a top end, generally designated 110, and a bottom end, generally designated 112. For efficient operation, the bottom end 112 of the cylinder 108 should be closed and the top end 110 of the cylinder should be vented, such as to atmosphere or to the body of water 134. If the top end 110 is to be vented to the body of water 134, the top end may simply be left open.

The pump means 106 further comprises a reciprocal piston 114 in the cylinder 108 and a piston rod 116 which has a first end, generally designated 118, connected to the piston 114 and a second end, generally designated 120, which extends sealably out of the bottom end 112 of the cylinder 108. The piston rod 116 may be slidably sealed with the bottom end 112 of the cylinder 108 by a conventional packing box or stuffing gland. The second end 120 of the piston rod 116 is connected to the anchor means 104. The anchor means 104 limits the upward movement of the piston 114 and piston rod 116 relative to the cylinder 108 and float means 102.

The cylinder 108, in the example embodiment of FIG. 8, further comprises an inlet 122 and outlet 124 to the cylinder with an inlet check valve 126 connected to the inlet 122 and an outlet check valve 128 connected to the outlet 124. The inlet check valve 126 allows water to flow into, but not out of the cylinder 108 through inlet 122. The outlet check valve 128 allows water to flow out of, but not into, the cylinder 108 through outlet 124.

The pump means 106 is further comprised of a mechanical tensioning means 130, mechanically connected between the piston 114 and the cylinder 108, for maintaining resilent tension between the piston 114 and the cylinder 108 and for downstroking the cylinder 108 relative to the piston in response to a falling wave action. The mechanical tensioning means 130 may be connected between any points on the cylinder 108 or apparatus 100 and piston 114 which will not interfere with the reciprocal travel of the piston 114 and which will allow the mechanical tensioning means 130 to maintain resilient tension between the piston 114 and cylinder 108, which will also maintain the cylinder 108 and float means 102 under downward tension. The mechanical tensioning means should be sized to maintain sufficient tension between the piston 114 and cylinder 108 that the float 102 will be held in tension with the surface of the water at all anticipated water, wave, or tide levels. The selected tension should maintain the apparatus 100 in a generally vertical orientation and allow the piston 114 to substantially stroke inside the cylinder 108 as the float 102 and cylinder 108 rise and fall with each wave at all anticipated water or tide levels.

The float means 102 is connected to the cylinder 108 and captures the wave energy necessary to reciprocate the cylinder 108 relative to the anchored piston 114 as the float means rides up and down on passing waves 132 in the body of water 134. Preferably the float means 102 is connected near the top end 110 of the cylinder 108. In the example embodiment of FIG. 8 the float means 102 is connected to the cylinder 108 with a flexible tensile means 136, such as a cable or chain. The anchor means 104 should also be flexibly connected to the piston rod 116 with a flexible tensile means 138, such as a cable or chain.

In operation, as the float means 102 floats up on a passing wave the cylinder 108 is pulled upwards relative to the anchored piston 114 and piston rod 118. In the embodiment of FIG. 8, the inlet 126 and outlet 128 are located on the cylinder 108 between the bottom end 112 of the cylinder and the lowermost position of reciprocal travel of the piston 114 relative to the cylinder 108, as illustrated in FIG. 8. Therefore, as the float means 102 and cylinder 108 rise on the wave 132, the relative downward motion of the anchored piston 114 forces water out of cylinder 108 through the outlet check valve 128 and imparts energy to mechanical tensioning means 130. As the float means 102 and cylinder 108 fall with a wave 132 the mechanical tensioning means 130 pulls the cylinder 108 downward and the relative upward motion of the piston 114 into the cylinder pulls water into the cylinder through the inlet check valve 126.

As illustrated in the example embodiment of FIG. 8 the mechanical tensioning means 130 may comprise a spring, also designated 130, connected between the piston 114 and cylinder 108. The spring may be connected in any manner which will maintain resilient tension between the piston and cylinder. As exemplified in FIG. 8, the spring 130 can be connected inside the cylinder 108, between the piston 114 and the top end 110 of the cylinder. In the configuration of inlet 126 and outlet 128, illustrated in FIG. 8, the piston 114 may be selected to sealingly isolate the spring 130 from contact with the pumped water and the top end 110 of the cylinder 108 may be sealed to enclose the spring 130 in a substantially watertight spring compartment 140. This isolation from water contact may be desired to prolong the life of the spring 130. If the spring 130 is so isolated, the efficiency of the apparatus 100 should be enhanced by venting the spring compartment 140 to the surface, by enlarging the cylinder 108 and spring compartment 140, or by taking other measures to decrease the resistance of the closed spring compartment 140 to compression. If it is not desired to isolate the spring 130 from water contact, the top end 110 of the cylinder 108 may be left open to increase the efficiency of the apparatus 100. The spring 130 may also be located outside the cylinder 108. For example, the spring 130 may be connected between the second end 120 of piston rod 116 and the outside surface of cylinder 108.

The wave energy extraction system 100 may also comprise a conduit 142 connected from the outlet check valve 128 and extendable to an area where the pumped water may be useful.

The mechanical tensioning means 130, exemplified as a spring in FIG. 8, may also comprise a weight 143 and tether 144, as exemplified in FIG. 11. The tether 144 extends from a fast connection 145 with piston 114 through a slidable connection 146 with cylinder 108 to a fast connection 147 with the weight 143. The slidable connection 146 is a pulley, also designated 146, in the preferred embodiment although any type of connection which will slidably engage the tether 144 with the cylinder 108 will work. The weight 143 and tether 144 may be connected in any manner, through any number of pulleys, which will maintain resilient tension between the piston 114 and cylinder 108. For example, the tether 144 could be connected from the second end 120 of piston rod 116 through a pulley mounted on the outside of cylinder 108 to a weight. The use of the weight 143 and tether 144 should be particularly beneficial when the float means 102 has buoyancy greater than the resilient strength of available springs. The size and mass of the weight 143 may be varied as necessary to maintain resilient tension between the float means 102 and the pump means 106.

FIG. 9 presents an example embodiment of a wave energy extraction or pumping apparatus, based on FIG. 2, generally designated by the reference number 150. The apparatus 150 is generally comprised of a float means 152, an anchor means 154, and an energy extraction means, generally designated 156, connected between the float means 152 and the anchor means 154. In this embodiment the energy extraction means 156 is a pump means which is comprised of a cylinder 158. The cylinder 158 is normally retained in a generally vertical position by the float means 152 and the anchor means 154 and, in the example embodiment, has a top end, generally designated 160, and a bottom end, generally designated 162. For best operation, the top end 112 of the cylinder 160 should be closed and the bottom end 162 of the cylinder should be vented, preferably to atmosphere or to the body of water 134. If the top end 110 is to be vented to the body of water 134, the top end may simply be left open.

The pump means 156 further comprises a reciprocal piston 164 in the cylinder 158 and a piston rod 166 which has a second end, generally designated 170, connected to the piston 164 and a first end, generally designated 168, which extends sealably out of the top end 160 of the cylinder 158. The piston rod 166 may be slidably sealed with the top end 160 of the cylinder 158 by a conventional packing box or stuffing gland. The first end 168 of the piston rod 166 is connected to the float means 152.

In this embodiment, the anchor means 154 is connected to the cylinder 108 and limits the upward movement of the cylinder relative to the piston 164 and float means 152. Preferably, the anchor means 154 is connected to the cylinder 108 near the bottom end 162 of the cylinder.

The cylinder 158, in the example embodiment of FIG. 9, further comprises an inlet 172 and outlet 174 to the cylinder with an inlet check valve 176 connected to the inlet 172 and an outlet check valve 178 connected to the outlet 174. The inlet check valve 176 allows water to flow into, but not out of, the cylinder 158 through inlet 172. The outlet check valve 178 allows water to flow out of, but not into, the cylinder 158 through outlet 174.

The pump means 156 is further comprised of a mechanical tensioning means 180, mechanically connected between the piston 164 and the cylinder 158, for maintaining resilient tension between the piston 164 and the cylinder 158 and for downstroking the piston 164 relative to the cylinder in response to a falling wave action, as illustrated in FIG. 9. The mechanical tensioning means 180 may be connected between any points on the cylinder 158 or apparatus 150 and the piston 164 which will not interfere with the reciprocal travel of the piston 164 and which will allow the mechanical tensioning means 180 to maintain resilient tension between the cylinder 158 and the piston 164, which will also maintain the piston 164 and float means 152 under downward tension. The mechanical tensioning means 180 should be sized to maintain sufficient tension between the piston 164 and cylinder 158 that the float 152 will be held in tension with the surface of the water at all anticipated water, wave, or tide levels. The selected tension should maintain the apparatus 150 in a generally vertical orientation and allow the piston 164 to substantially stroke inside the cylinder 158 as the float 152 and piston 164 rise and fall with each wave at all anticipated water or tide levels.

The float means 152 is connected to the piston rod 166 and captures the wave energy necessary to reciprocate the piston 164 relative to the anchored cylinder 158 as the float means 152 floats up and down on passing waves 182 in the body of water 184. In the example embodiment of FIG. 9 the float means 152 is connected to the piston rod 166 with a flexible tensile means 186, such as a cable chain. The anchor means 154 should also be flexibly connected to the cylinder 108 with a flexible tensile means 188, such as a cable or chain.

In operation, as the float means 152 floats up on a passing wave 182, the piston rod 166 and piston 164 are pulled upwards relative to the anchored cylinder 158. In the embodiment of FIG. 9, the inlet 176 and outlet 178 are located on the cylinder 158 between the top end 160 of the cylinder and the uppermost position of reciprocal travel of the piston 164 relative to the cylinder 158, as illustrated in FIG. 9. Therefore, as the float means 102 and piston 164 rise with a wave 182 the relative upward motion of the piston 164 into the cylinder 158 forces water from the cylinder through the outlet check valve 178 and imparts energy to the mechanical tensioning means 180. As the float means 102 falls with a wave 182, the mechanical tensioning means 180 pulls the piston 164 downward relative to the anchored cylinder 158 and pulls water into the cylinder 158 through the inlet check valve 176.

As illustrated in the example embodiment of FIG. 9 the mechanical tensioning means 180 may comprise a spring, also designated 180, connected between the piston 164 and cylinder 158. The spring 180 may be connected in any manner which will maintain resilient tension between the piston 164 and cylinder 158. As exemplified in FIG. 9 the spring 180 can be connected inside the cylinder 158, between the piston 164 and the bottom end 162 of the cylinder. In the configuration of inlet 126 and outlet 128 illustrated in FIG. 9, the piston 164 may be selected to sealingly isolate the spring 180 from contact with the pumped water and the bottom end 162 of the cylinder 158 may be sealed to enclose the spring 180 in a substantially watertight spring compartment 190. This isolation from water contact may be desired to prolong the life of the spring 180. If the spring is so isolated, the efficiency of the system 150 should be enhanced by venting the spring compartment 190 to the surface, enlarging the cylinder 158 and spring compartment 190, or by taking other measures to decrease the resistance of the closed spring compartment 190 to compression. If it is not desired to isolate the spring 180 from water contact, the bottom end 162 of the cylinder 158 may be left open to increase the efficiency of the apparatus 150. The spring 180 may also be located outside the cylinder 158. For example, the spring 180 may be connected between the first end 168 of piston rod 166 and the outside surface of cylinder 158.

The pumping apparatus 150 may also comprise a conduit 192 connected from the outlet check valve 178 and extendable to an area where the pumped water may be useful.

The mechanical tensioning means 180, exemplified as a spring in FIG. 9, may also comprise a weight 193 and tether 194, as exemplified in FIG. 12. The tether 194 extends from a fast connection 195 with cylinder 162 through a slidable connection 196 with piston 164 to a fast connection 197 with the weight 193. The slidable connection 196 is a pulley, also designated 196, in the preferred embodiment although any type of connection which will slidably engage the tether 194 with the piston 164 will work. The weight 193 and tether 194 may be connected in any manner, through any number of pulleys, which will maintain resilient tension between the piston 164 and cylinder 158. For example, the tether 194 could be connected from the outside surface of cylinder 158 through a pulley mounted on the first end 168 of piston rod 166 to a weight. The use of the weight 193 and tether 194 should be particularly beneficial when the float means 152 has buoyancy greater than the resilient strength of available springs. The size and mass of the weight 193 may be varied as necessary to maintain resilient tension between the float means 152 and the pump means 156.

In the following discussion concerning FIG. 10 apparatus 150 of FIG. 9 is specifically discussed for purposes of illustration, but it should be understood that the discussion is meant to apply to all water-pumping embodiments of this invention.

Figure 10:
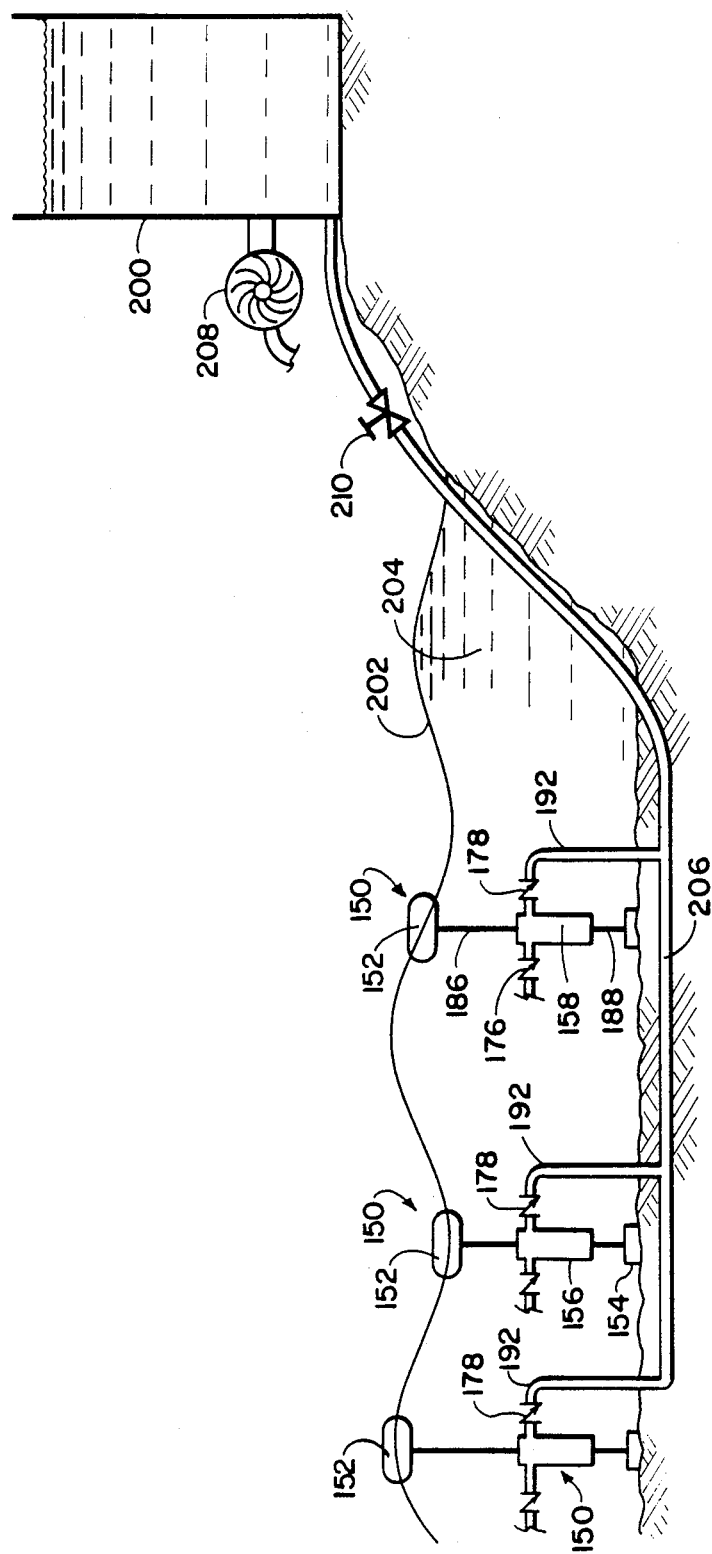
FIG. 10 is a schematic diagram of an applied use and means of protecting at least one embodiment of the wave energy extraction apparatus from excessive wave action.

FIG. 10 represents an exemplary use of the present invention as well as a means of protecting at least one embodiment of the apparatus 150 from excessive wave action. As illustrated in FIG. 10, at least one of the pumping apparatus 150 is connected to a water holding means 200. The water holding means 200 is located above the water level 202 of the body of water 204 and above the pumping apparatus 150. The water holding means 200 may be a reservoir, surge pipe, or any means of at least temporarily retaining and directing the elevated pumped water and the potential energy stored therein. An example use of the elevated water, illustrated in FIG. 10, would be to turn a turbine generator 208.

The conduits 192 from the outlet check valves 178 are connected to the water holding means 200. In FIG. 10 conduits 192 are connected to the water holding means through common conduit 206. A valve means 210 is located in the conduit 206 above the water level 202 of the body of water 204, and above the at least one pumping apparatus 150, for opening and closing the communication between the pumping apparatus and the water holding means 200 through the conduit 206. Conduits 192 may be individually connected to the water holding means 200 and may have a valve means 206 in each conduit 192.

The valve means 210 may be used to protect a pumping apparatus 192 which has the inlet 172 and outlet 174 in the cylinder 158 located on the opposite side of the piston 164 from the mechanical tensioning means 180 as illustrated in FIG. 9, (or FIGS. 8, 10, and 11) by closing the valve means 210. Closing the valve means 210 backs up water pressure against the outlet check valve 178 and the piston 164 of the pumping apparatus 150 and prevents the piston 164 and float means 152 from rising with the waves. With each successively lower wave trough the pumping apparatus 150 will draw more water into the cylinder 158, and since the piston 164 and float means 152 can not rise to discharge the water from the cylinder, the float means 152 will sink to the lowest wave trough level and remain there. The valve means 210 may be a manually or an automatically operated device.

The described embodiments of the pumping apparatus may be made of low cost, easily obtained and replaced parts of plastic, polymer, metal, wood, and styrofoam. Because the parts are easily obtainable (metal, plastic or polymeric pumps, valves and floats are commercially available, as are springs, cables, chains, and anchors of various materials) they may be of cheaper materials having a limited life in order to keep the cost of the apparatus to a minimum.

It will be clear that the presence of the mechanical storage means in each of these embodiments makes it possible for the float to rise as the wave surface rises as the ride rises. The force exerted on the float by the tension member through the mechanical storage means is sufficient to maintain the float on the surface of the water 14 and yet is compliant enough to permit the float to move upwardly as the tide's height increases. As the tide moves out and the level of the wave drops, then the mechanical storage means continues to provide the tension necessary to permit the float to move downwardly and also maintains sufficient tension between the piston and cylinder for the apparatus to function properly.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. An apparatus for pumping water using energy from wave action in a body of water, comprising:
   a cylinder having a top end and having a bottom end;
   a reciprocal piston in said cylinder, said piston including a piston rod connected to said piston and extending sealably out the bottom end of said cylinder;
   an inlet extending through the wall of said cylinder for drawing water into said cylinder from the body of water and an outlet extending through the wall of said cylinder for expelling water from said cylinder;
   an inlet check valve connected to said inlet and an outlet check valve connected to said outlet, the outlet check valve being connectable to a conduit, the conduit being extendable to an area where pumped water may be usefully employed;

an anchor means, flexibly connected to said piston rod, for anchoring said piston rod relative to said cylinder;

a float means, connected to said cylinder, for upstroking said cylinder relative to said piston in response to a rising wave action, whereby said upstroking cylinder expels water through said outlet check valve in response to rising wave action, said float means being connected to said cylinder in such a manner that said float means floats above said cylinder when said pumping apparatus is placed in the body of water; and a mechanical tensioning means, mechanically connected between said cylinder and said piston, for continuously maintaining resilient tension between said piston and said cylinder, between said float and said anchor means, and between said cylinder and said anchor means and for downstroking said cylinder relative to said piston in response to a falling wave action, whereby said downstroking cylinder draws water into said cylinder through said inlet check valve in response to falling wave action.

2. The apparatus of claim 1:

wherein said mechanical tensioning means is a spring.

3. The apparatus of claim 1:

wherein said mechanical tensioning means is a weight and tether, the tether extending from a fast connection with said piston through a slidable connection with said cylinder to a fast connection with the weight.

4. The apparatus of claim 1, further comprising:

flexible tensile means for flexibly connecting said float means to said cylinder.

5. The apparatus of claim 1:

wherein the top end of said cylinder is vented.

6. The apparatus of claim 1, further comprising:

a water holding means, located above the water level of the body of water and said pumping apparatus, for at least temporarily retaining the pumped water;

wherein at least one said water pumping apparatus is connected to said water holding means; and wherein said conduit is connected from said outlet check valve to said holding means.

7. The apparatus of claim 6, further comprising:

a valve means, located in said conduit above the water level of the body of water and said at least one pumping apparatus, for opening and closing the communication between said at least one water pumping apparatus and said holding means through said conduit.

8. An apparatus for pumping water using energy from wave action in a body of water, comprising:

a cylinder having a top end and having a bottom end;

a reciprocal piston in said cylinder, said piston including a piston rod connected to said piston and extending sealably out the top end of said cylinder;

an inlet extending through the wall of said cylinder for drawing water into said cylinder from the body of water and an outlet extending through the wall of said cylinder for expelling water from said cylinder;

an inlet check valve connected to said inlet and an outlet check valve connected to said outlet, the outlet check valve being connectable to a conduit, the conduit being extendable to an area where pumped water may be usefully employed;

an anchor means, flexibly connected to said cylinder, for anchoring said cylinder relative to said piston;

a float means, connected to said piston rod exteriorly of said cylinder, for upstroking said piston relative to said cylinder in response to a rising wave action, whereby said upstroking piston expels water through said outlet check valve in response to rising wave action, said float means being connected to said piston rod in such a manner that said float means floats above said piston rod and cylinder when the pumping apparatus is placed in the body of water; and a mechanical tensioning means, mechanically connected between said cylinder and said piston for continuously maintaining resilient tension between said piston and said cylinder, between said float and said anchor means, and between said piston and said anchor means and for resiliently downstroking said piston relative to said cylinder in response to a falling wave action, whereby said downstroking piston draws water into said cylinder through said inlet check valve in response to falling wave action.

9. The apparatus of claim 8:

wherein said mechanical tensioning means is a spring.

10. The apparatus of claim 8:

wherein said mechanical tensioning means is a weight and tether, the tether extending from a fast connection with said cylinder through a slidable connection with said piston to a fast connection with the weight.

11. The apparatus of claim 8, further comprising:

flexible tensile means for flexibly connecting said float means to said piston rod.

12. The apparatus of claim 8:

wherein the bottom end of said cylinder is vented.

13. The apparatus of claim 8, further comprising:

a water holding means, located above the water level of the body of water and said pumping apparatus, for at least temporarily retaining the pumped water;

wherein at least one of said water pumping apparatus is connected to said water holding means; and wherein said conduit is connected from said outlet check valve to said holding means.

14. The apparatus of claim 13, further comprising:

a valve means, located in said conduit above the water level of the body of water and said at least one pumping apparatus, for opening and closing the communication between said at least one water pumping apparatus and said holding means through said conduit.

15. A method of converting the wave energy of a body of water to electrical energy, comprising the steps of:

flexibly anchoring a reciprocating pump having a piston and a cylinder in the body of water;

mechanically connecting a mechanical tensioning means between said piston and said cylinder;

connecting an inlet check valve and an outlet check valve to said cylinder:

connecting a float on the water surface to said pump;

sizing said float and pump and the connection between said float and pump to allow rising wave action of the body of water to raise said float and to stroke said piston relative to said cylinder, thereby pumping water through said outlet check valve with said pump;

sizing said mechanical tensioning means to maintain resilient tension between said piston and said cylinder as said float rises and falls with wave action and to utilize the resilient tension to stroke said piston relative to said cylinder as said float falls with falling wave action, thereby drawing water from said body of water through said inlet check valve into said pump and holding said float in tension between the water surface and said pump;

conducting the water pumped from said pump through a conduit to a water storage tank above the surface of said body of water; and using the water in said storage tank to operate a hydroelectric generator for making electrical power.

16. The method of claim 15:
wherein said float is connected to the piston of said pump and said anchor is connected to the cylinder of said pump.

17. The method of claim 15:
wherein said float is connected to the cylinder of said pump and said anchor is connected to the piston of said pump.

18. An apparatus for pumping water using energy from wave action in a body of water, consisting essentially of:
a cylinder having a top end and having a bottom end;
a reciprocal piston in said cylinder, said piston including a piston rod connected to said piston and extending sealably out the bottom end of said cylinder;
an inlet extending through the wall of said cylinder for drawing water into said cylinder from the body of water and an outlet extending through the wall of said cylinder for expelling water from said cylinder;
an inlet check valve connected to said inlet and an outlet check valve connected to said outlet, the outlet check valve being connectable to a conduit, the conduit being extendable to an area where pumped water may be usefully employed;
anchor means, flexibly connected to said piston rod, for anchoring said piston rod relative to said cylinder;
float means, connected to said cylinder, for upstroking said cylinder relative to said piston in response to a rising wave action, whereby said upstroking cylinder expels water through said outlet check valve in response to rising wave action, said float means being connected to said cylinder in such a manner that said float means floats above said cylinder when said pumping apparatus is placed in the body of water; and
mechanical tensioning means, mechanically connected between said cylinder and said piston, for continuously maintaining resilient tension between said piston and said cylinder, between said float and said anchor means and between said cylinder and said anchor means and for downstroking said cylinder relative to said piston in response to a falling wave action, whereby said downstroking cylinder draws water into said cylinder through said inlet check valve in response to falling wave action.

19. The apparatus of claim 18:
wherein said mechanical tensioning means is at least one spring.

20. The apparatus of claim 18:
wherein said mechanical tensioning means is at least one weight and tether, the tether extending from a fast connection with said piston through a slidable connection with said cylinder to a fast connection with the weight.

21. The apparatus of claim 18, further consisting essentially of:
flexible tensile means for flexibly connecting said float means to said cylinder.

22. The apparatus of claim 18:
wherein the top end of said cylinder is vented.

23. The apparatus of claim 18, further consisting essentially of:
water holding means, located above the water level of the body of water and said pumping apparatus, for at least temporarily retaining the pumped water;
wherein at least one said water pumping apparatus is connected to said water holding means; and
wherein said conduit is connected from said outlet check valve to said holding means.

24. The apparatus of claim 23, further consisting essentially of:
valve means, located in said conduit above the water level of the body of water and said at least one pumping apparatus, for opening and closing the communication between said at least one water pumping apparatus and said holding means through said conduit.

25. An apparatus for pumping water using energy from wave action in
a body of water, consisting essentially of:
a cylinder having a top end and having a bottom end;
a reciprocal piston in said cylinder, said piston including a piston rod connected to said piston and extending sealably out the top end of said cylinder;
an inlet extending through the wall of said cylinder for drawing water into said cylinder from the body of water and an outlet extending through the wall of said cylinder for expelling water from said cylinder;
an inlet check valve connected to said inlet and an outlet check valve connected to said outlet, the outlet check valve being connectable to a conduit, the conduit being extendable to an area where pumped water may be usefully employed;
anchor means, flexibly connected to said cylinder, for anchoring said cylinder relative to said piston;
float means, connected to said piston rod exteriorly of said cylinder, for upstroking said piston relative to said cylinder in response to a rising wave action, whereby said upstroking piston expels water through said outlet check valve in response to rising wave action, said float means being connected to said piston rod in such a manner that said float means floats above said piston rod and cylinder when the pumping apparatus is placed in the body of water; and
mechanical tensioning means, mechanically connected between said cylinder and said piston, for continuously maintaining resilient tension between said piston and said cylinder, between said float and said anchor means, and between said piston and said anchor means and for resiliently downstroking said piston relative to said cylinder in response to a falling wave action, whereby said downstroking piston draws water into said cylinder through said inlet check valve in response to falling wave action.

26. The apparatus of claim 25:
wherein said mechanical tensioning means is at least one spring.

27. The apapratus of claim 25:
wherein said mechanical tensioning means is at least one weight and tether, the tether extending from a fast connection with said cylinder through a slidable connection with said piston to a fast connection with the weight.

28. The apparatus of claim 25, further consisting essentially of:
flexible tensile means for flexibly connecting said float means to said piston rod.

29. The apparatus of claim 25:
wherein the bottom end of said cylinder is vented.

30. The apparatus of claim 25, further consisting essentially of:
water holding means, located above the water level of the body of water and said pumping apparatus, for at least temporarily retaining the pumped water;
wherein at least one of said water pumping apparatus is connected to said water holding means; and
wherein said conduit is connected from said outlet check valve to said holding means.

31. The apparatus of claim 30, further consisting essentially of:
valve means, located in said conduit above the water level of the body of water and said at least one pumping apparatus, for opening and closing the communication between said at least one water pumping apparatus and said holding means through said conduit.

* * * * *